United States Patent [19]
Hallen et al.

[11] 3,742,245
[45] June 26, 1973

[54] MOUNTING MEANS FOR A LEVEL SENSING DEVICE

[75] Inventors: Jan-Åke Hallén, Partille; Lars Stiernström, Goteborg, both of Sweden

[73] Assignee: Ingeniorsfirman Gunnar Abrahamson AB, Malmo, Sweden

[22] Filed: July 9, 1971

[21] Appl. No.: 161,115

[30] Foreign Application Priority Data
July 9, 1970 Sweden................................ 9522/70
Aug. 24, 1970 Sweden............................. 11460/70

[52] U.S. Cl. .............................. 307/118, 70/304 R
[51] Int. Cl. ............................................ H01h 35/18
[58] Field of Search ...................... 70/304 R, 304 C, 70/290 R; 219/289; 340/213, 266, 282; 367/116, 118, 149

[56] References Cited
UNITED STATES PATENTS
3,339,411  9/1967  Riffie ................................ 73/304 R Primary Examiner—Herman J. Hohauser
Attorney—Holman & Stern

[57] ABSTRACT

There are a number of types and sizes of containers intended to hold liquids, and it is difficult to stock level sensing devices suitable to all requirements. To simplify mounting and make possible the adjustment of an apparatus to fit a large number of different installations a level sensing apparatus includes a contact device and an attachment, which are interconnected by a carrier slidably fitted to at least one of said device or attachment. The carrier preferably is a rod provided with a scale to make possible a direct positioning of the device, and is further made of soft material or shaped in such a manner that it is easily deformed to both sides of the device, thereby definitely locking the latter in the desired position.

To make possible a check of the position of the apparatus, when the latter as been fitted into the container, a control member is fitted to the device and extends outside the container. This member is provided with a mark, and the distance between this mark and the wall of the container is a clear indication of the location of the device.

3 Claims, 4 Drawing Figures

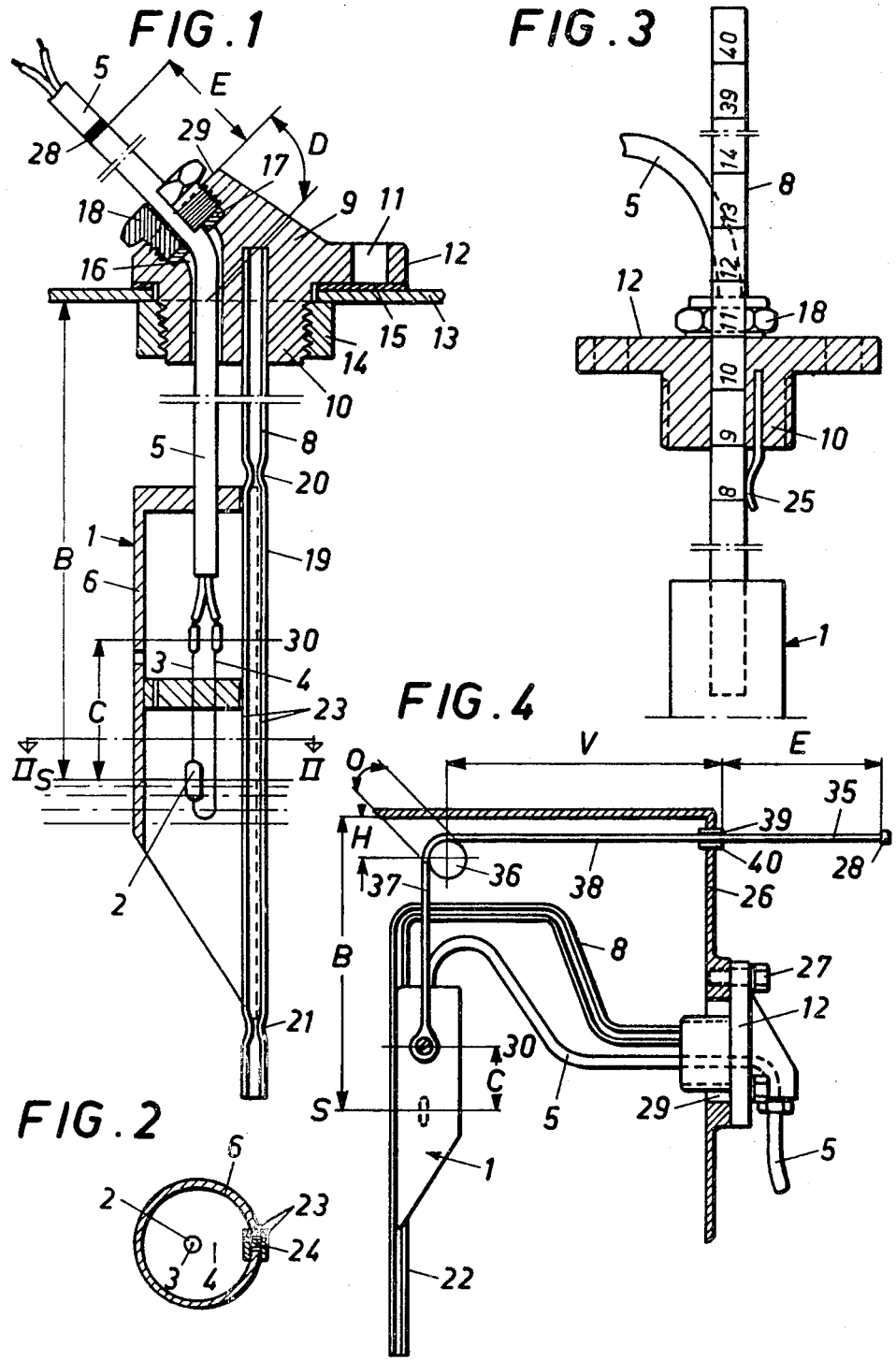

MOUNTING MEANS FOR A LEVEL SENSING DEVICE

BACKGROUND OF THE INVENTION

The invention refers to an improved mounting for a level sensing device, adapted to be mounted within a container holding liquid in order to sense the level therein, and to emit a signal for operating an apparatus, designed to shut off the admission of fluid to the container, or to replenish the contents therein.

Known devices of this type are designed as termistor units provided with splash guards. These devices operate very satisfactorily when they have been mounted, but there are certain difficulties involved in the mounting thereof.

In order to make possible the use of such devices with containers of different types and sizes commonly used it is necessary to stock a large number of a different types and sizes of devices, which evidently is expensive. The problem is usually solved by manufacturing a limited number of types, suited to the most common types of containers. For mounting within other types of containers it will then be necessary to redesign the devices, which on many occasions will imply considerable work and thus is expensive.

SUMMARY OF THE INVENTION

According to the invention these disadvantages are eliminated by providing a device, which is easily adjustable according to the requirements of a number of different types of containers. It is thus possible to locate the device in the proper position with respect to the desired liquid level without the aid of any tools. The device may then be locked by the aid of a simple tool, such as a pair of nippers or a screw driver or the like. The device further is provided with an attachment, which makes possible the mounting in a different manner at different types of containers.

The invention is characterized in that the device by means of a carrier is connected to an attachment, designed to be mounted at the wall of a container, said carrier being adjustable, with respect to at least one of said device or attachment in such a manner that the device may be arranged at any suitable level within containers of different sizes.

BRIEF DESCRIPTION OF THE DRAWINGS

FIG. 1 is an elevation, partly in section of one embodiment of the invention,

FIG. 2 is a cross section along line II — II in FIG. 1.

FIG. 3 schematically shows a modified embodiment of the invention, and

FIG. 4 shows a further embodiment adapted to be fitted to the side wall of a container.

DESCRIPTION OF SOME PREFERRED EMBODIMENTS

In the figures legend 1 denotes a level sensing device of known type, including a contact member 2, here shown as a termistor-body having conductors 3, 4 which are connected to a twin cable 5, the lower portion of which extends through a guard 6 enclosing the termistor and being open downwards. This guard is formed like a tube being obliquely cut in its lower end. The tube is provided with an open ended slot extending along its longest side. A rod 8, having an I-shaped cross section with flanges 23 and a main part 24, as shown in FIG. 2, is fitted into this slot.

The upper end of rod 8 is permanently fitted to an attachment 9. In order to make possible the mounting of this attachment at different types of containers the attachment is provided with a threaded neck 10, as well as with a flange 12 provided with bores 11. In the embodiment shown in FIG. 1 the neck 10 is screwed into a collar or sleeve 14 welded to upper portion 13 of the container in such a manner that the flange 12 in cooperation with a packing 15 will seal against the upper portion 13.

The attachment 9 is provided with a passage 16 for the twin cable 5. This passage 16 is, as shown in FIG. 1, angularly bent, whereby its outward end will open in a side face of the attachment. It may, however, also be directed upwards as indicated in FIG. 3. In the embodiments shown the opening of the passage is sealed by means of a rubber packing 17, which tightly fits around the twin cable 5 and is forced into the attachment by means of a threaded sleeve 18.

During the mounting the device 1 is adjusted to the desired level by being displaced along rod 8, during which operation the edges of the slot will be guided by the flanges of the I-shaped rod. In order to facilitate the adjustment, the rod at the side face denoted by 19 is provided with a scale, similar to that shown in FIG. 3. When the device has been brought to the proper position it is locked by deforming the the flanges 23 as indicated at 20 and 21. These deformations are easy to make by applying pressure by means of a hard implement, or by means of a pair of nippers, especially if the rod 8 is manufactured of soft, easily deformable material.

Instead of pushing the device along a rod which is fixed to the attachment, it is possible instead to make the rod displaceable with respect to the attachment, and have a permanent connection between the rod and the device, as is shown in FIG. 3, where the rod 8 is provided with a scale and is acted upon by a spring 25 fitted into the attachment in such a manner that a smooth sliding movement between the rod and attachment is obtained. Even on this occasion it is easy to lock the device by deforming the flanges of the rod adjacent to the attachment. Alternatively one flange may be serrated to cooperate with a pawl or edge at spring 25. The portion of rod 8 extending outside the attachment may be cut off.

The embodiment shown in FIG. 4 is adapted to be mounted at a vertical wall 26 of a container, to which the flange 12 is connected by means of screws 27 entering into threaded bores in a strengthening ring, which surrounds an opening 29 in wall 26. A bent rod 8, provided with a vertical portion 22, has to be fitted through this opening, and on its vertical portion the device 1 is displaceable in the same manner as previously described. The opening is sufficiently large to permit the introduction of the device mounted on the rod. The rod 8 is carried by the attachment 9, the rod preferably being cast into the neck portion thereof.

When mounting the device in a container the device is brought to a position suited to the desired level with respect to the attachment. When the device has been locked by deformation of the flanges 23 the cable 5 is shortened to the desired length and the rubber packing is forced into position. The rod with the device is then brought into the container, and the attachment is screwed tightly to the container wall by means of the screws 27. In all three embodiments the cable 5 in any suitable manner is connected to an operating device of well known type, designed to interupt the supply of fluid to the container if the device is mounted to sense the high level and to start replenishing the fluid if mounted to sense the low level.

In practical use of level sensing devices it has proven important to be able to control the position of the device within the container. On such occasions it has hitherto been necessary to remove the complete apparatus from the container in order to perform the desired control. According to a development of the invention it is possible to perform such control in a simple and a time-saving manner by directly reading a measure, or by measuring and comparing the reading with a table.

The level of the liquid when contacting the termistor body is in FIGS. 1 and 4 denoted S. The two leads 3 and 4, of the termistor body are formed in such a manner that they at a definite distance, C, from level S are prepared for soldering to corresponding leads in the twin cable 5, the ends of which are prepared in such a manner that the distance C between level S and a point of connection 30 during series manufacture will always be equal.

In FIG. 1 the cable 5 is at a known distance from the point of connection provided with a mark 28. This preferably consists of a colored stripe around the cover of the cable and is located at a distance A from the contact member 2. The twin cable 5 slidably passes through opening 16 in the attachment and distance A is selected so that mark 28 will always be located outside the container, the cable extending outside the attachment by the measure E.

The attachment has a surface 29 perpendicular to the opening 16 which serves as a reference point, and which, when the attachment is mounted, will be located at a constant distance D from the inside of the upper portion 13 of the container.

The interesting measure is distance B between the upper portion of the container and the contact member 2. The distance A, i.e. the linear distance between the contact member and the mark 28 is equal to the sum of distances $B + D + E$. If the measure between the point of connection 30 and the mark 28 during manufacture is always maintained at the same value, as is the distance C between the contact member and the point of connection, then the distance A will always be known for each manufactured unit. The same applies to measure D. When the twin cable is stretched the measure $A = B + D + E$, or $A - D = B + E$. It is then possible to measure the distance E between the mark 28 and reference point 29. The desired measure, B, is then obtained by the fixed measure $A - D = F$, which is determined by the design, being reduced by the measured distance E : thus $B = F - E$. With the embodiment shown in FIG. 4 the space above the container makes the use of the previously described embodiment unsuitable and here the attachment is mounted at a side wall of the container. A control or measuring member 35 here consists of a separate wire which is attached to device 1 level with the point of contact 30 and passes over a sheave 36 so it will include a vertical portion 37 and a horizontal portion 38. The latter passes out through an opening 39 provided with an reference point 40 outside the container, where the wire is provided with a mark 28. The center of the sheave is located at a known vertical distance, H, from the underside of the upper portion of the container, and similarly on a known horizontal distance V from the reference point 40.

If the total extension of the wire between the contact member 2 and the mark 28 is called A, the distance between the contact member and the upper portion of the container is called B, and the portion of the wire passing along the sheave is called O, then $A = B - H + O + V + E$, or $B = A + H - O - V - E$. On this occasion A, H, O and V are measures defined by the design, and the arithmetic sum thereof is known. If this sum is called F the desired distance, B, is obtained by measuring the distance E and subtracting this from the known distance, thus $B = F - E$.

The correlations between these two values may easily be calculated, but can of course, to avoid mistakes, be entered on a table. The wire may also be provided with a scale in such a manner that measuring may be performed directly at reference point 40. On this occasion the scale will substitute mark 28.

We claim:

1. Means for mounting a level sensing device within a container in which the device is connected to a removable attachment designed to be mounted in an opening in a wall of the container, the improvement that the device is mounted upon a rod-like carrier including a substantially vertical portion upon which the device is slidably mounted, to be locked at any desired distance from the attachment.

2. The means according to claim 1 in which the carrier is made of deformable material, and has an I-shaped cross section, between the flanges of said Iguides at the device are governed during the adjustment, the locking being brought about by a deformation of the flanges.

3. Means for controlling the position of a level sensing device mounted within a container by means of a rod cooperating with an attachment fitted to a wall of the container, the distance between the device and attachment being individually adjustable by a relative displacement of said device and said attachment along the rod, the improvement of a member being attached to the device, and slidingly passing out through a wall of the container, said member being provided with markings at known distances and of sufficient magnitude to guarantee that at least some of said markings will always be located outside the attachment.

* * * * *